Patented Mar. 23, 1943

2,314,831

UNITED STATES PATENT OFFICE 2,314,831

PREPARATION OF D-TARTARIC ACID BY FERMENTATION

Jonas Kamlet, Brooklyn, N. Y., assignor to Miles Laboratories, Inc., Elkhart, Ind., a corporation of Indiana No Drawing. Application September 25, 1940, Serial No. 358,304

14 Claims. (Cl. 195—47)

The present invention relates to the preparation of dextro-tartaric acid and, more particularly, to a process by which dextro-tartaric acid may be prepared in a simple and economical manner from cheap and readily available raw materials.

The preparation of tartaric acid from materials unrelated to the production of wine, has been a matter of great interest and the subject of numerous investigations to the present date.

It has been proposed to prepare meso- and dl-tartaric acids by reducing glyoxylic acid with zinc dust and acetic acid (Bull. Soc. Chim. France, (3), 7#226, 1892), or by electrolytic reduction (German Patent 292,865, of 1912, U. S. P. 1,181,555 of 1916, U. S. P. 1,190,845 of 1916, U. S. P. 1,420,212 of 1922). Maleic and fumaric acids are oxidized to tartaric acids with sodium chlorate and $OsO_4$ (Berichte, 46, 1667, 1913; J. Am. Chem. Soc., 47, 1412, 1925), or by chlorination followed by the hydrolysis of the resultant dichlor-succinic acid (English Patent 242,590 of 1925). These methods yield optically inactive tartaric acids and have not found any considerable field of utility heretofore.

The preparation of tartaric acids by the oxidation of carbohydrate materials originated in 1860 with Liebig (Annalen, 113, 1) who oxidized lactose with nitric acid to obtain a mixture of dextro- and meso-tartaric acids. Hornemann (Journ. prakt. Chem. (1), 89, 287) described the oxidation of sucrose, glucose or starch with nitric acid, in 1863. More recently, other oxidizing agents have been described. Ellis (U. S. P. 789,269 of 1905) and the Diamalt A. G. (German Patent 389,624 of 1924) describe the anodic electrolytic oxidation of carbohydrate materials. German Patents 415,685 of 1926, 426,864 of 1926, and 427,415 of 1926 describe the use of peroxides in the presence of organic oxidases as catalysts. Odell (U. S. P. 1,425,605 of 1922), Barch (Journ. Amer. Chem. Soc. 55, 3653, 1933), and Stokes and Peter (U. S. P. 1,870,472 of 1932) make use of nitric acid in the presence of metallic catalysts or inhibiting agents in effecting a carbohydrate oxidation.

The disadvantages of all of the methods heretofore described lies in the fact that mixtures of dextro-, meso- and dl-tartaric acids with oxalic, saccharic and other acids are obtained, often in poor yields. The separation of these compounds is difficult and commercially impractical.

Pasternack (U. S. P. 2,197,021 of 1940) has recently described a method for the preparation of d-tartaric acid, free of isomers, which comprises oxidizing a member of the group consisting of 5-keto-d-gluconic acid and its salts by the action of an oxygen-containing gas at a pH between 0.1 and 14.0, in the presence or absence of a metallic catalyst compound. This process starts with 5-keto-d-gluconic acid, or a soluble salt thereof. These compounds are prepared from the difficultly soluble calcium 5-keto-d-gluconate which is obtained by biological methods or by chemical oxidation, as described by the inventor.

It is the further purpose of this invention to provide a process whereby dextro-tartaric acid, substantially free of isomers, may be prepared by a direct fermentative oxidation of a cheap and readily available carbohydrate, such as glucose.

The basis of the present invention is the finding that dextro-tartaric acid, substantially free of isomers, may be obtained in satisfactory yield by fermenting an aqueous solution of glucose with a viable strain of *Acetobacter suboxydans*, while passing through an oxygen-containing gas and properly regulating the pH of the mixture.

Some bacteria belonging to the family Acetobacteriacae (Bergey's Manual of Determinative Bacteriology) are characterized by the ability to effect an incomplete oxidation of carbohydrates, alcohols and acids, even when a liberal supply of oxygen is available. Butlin (Biochemical Journal 30, 1870 (1936); 32, 508 (1938) and Kluyver and Beozaardt (Rec. trav. Chem. Pays-Bas, 57, 609 (1938) have described the preparation of calcium-5-keto-d-gluconate by the fermentation of glucose with *Acetobacter suboxydans* in the presence of calcium carbonate. It is interesting to note that these authors describe an uptake of more than the two atoms of oxygen theoretically required to effect complete oxidation to the 5-keto-d-gluconic acid stage, when a culture of *Acetobacter suboxydans* that is no more than three days old is used.

The oxidation of glucose by a fermenting culture of *Acetobacter suboxydans* stops at the gluconic acid stage in the absence of calcium carbonate, but proceeds to the 5-keto-d-gluconic acid stage in its presence. This is attributable to the inhibition of the oxidative functions of the Acetobacter by the accumulating gluconic acid. When this acid is neutralized by the $CaCO_3$, soluble calcium gluconate is formed and further oxidized to calcium 5-keto-d-gluconate. The latter compound, however, is insoluble in water and will precipitate from the field of reaction.

This explains why the fermentation of glucose with *Acetobacter suboxydans* in the presence of calcium carbonate stops at the 5-keto-d-gluconic acid stage, although the stability and configuration of this acid is such that it is more susceptible to bacteriological oxidation than either glucose or gluconic acid. The insolubility of the calcium salt of 5-keto-d-gluconic acid inhibits further oxidation.

By maintaining the pH of a vigorously aerated solution of glucose inoculated with *Acetobacter suboxydans* at a range between pH 3.0 and pH 12.0, by the use of an alkali chosen from the group consisting of the hydroxides, carbonates and bicarbonates of the alkali metals, I find that six atoms of oxygen can be absorbed for every molecule of glucose consumed, i. e., the amount theoretically required for complete oxidation to dextrotartaric acid. For the best results, with most strains of *Acetobacter suboxydans*, a culture not more than three days old should be used as an inoculum. The optimum pH for this fermentation lies between pH 5.0 and pH 7.0 although good results can be obtained with a pH as low as 3.0 and as high as 12.0. The temperature of the fermenting mixture may vary from 10° to 40° C., but the optimum temperature for the growth of *Acetobacter suboxydans* is 27°–30° C.

Odell (U. S. Patent 1,425,605 of 1922), Barch (Journ. Amer. Chem. Soc., 55, 3653, 1933) and Pasternack (U. S. Patent 2,197,021 of 1940) have described and made use of the fact that vanadium compounds catalyze the splitting of the six-carbon glucose chain at the four-carbon stage. I find that small amounts of a vanadium compound (e. g. 0.1% to 0.5% of the weight of the glucose) added to the fermenting mixture will catalyze and accelerate the oxidative fermentation without inhibiting the growth and the viability of the *Acetobacter*.

It is obvious, of course, that hydrolyzed solutions of maltose, and all polysaccharides (such as starch and glycogen) which yield glucose upon inversion, can be used as sources of carbohydrates in this fermentation.

The following example of a typical application is intended to define and illustrate but in no way to limit this invention to the reagents, proportions, apparatus, or conditions described therein.

Preparation of seed culture

The parent culture of *Acetobacter suboxydans* used in this example was first described by Kulyver and de Leeuw (Tijdsch. vergelijk. Geneeskunde, 10, 170, 1924) and is available as #621 of the American Type Culture Collection. Subcultures of this parent strain are grown for three days on six tubes of wort-agar at 37° C. These cultures are then transferred to a large bottle containing one liter of a solution of 10% glucose and 0.5% Difco yeast extract, and aerated at 30° C. for 48 hours.

Fermentation of glucose

A solution of 3.0 kgs. of glucose and 1 liter of corn steep liquor in 30 liters of water is used as a substrate. The corn steep liquor is added as a source of nutrient material as suggested by Tilden (Journ. Bact., 37, 629, 1939) and may be substituted by 1.5 liters of a 5% aqueous solution of autolyzed yeast.

This substrate is inoculated with the 1 liter of seed culture prepared as above. Air is passed through the fermenting mixture at a pressure of 30 lbs. per square inch, as a finely dispersed stream. The pH of the mixture is kept at 5.5 to 6.0 by the addition of a saturated aqueous solution of sodium carbonate, from time to time. The temperature of the fermenting mixture should be kept at 28°–30° C.

The reaction is considered complete when there is no further change in pH after thirty minutes of aeration.

The completion of this fermentation may require eight to twenty-four hours of aeration depending on the viability of the culture, nature of the fermenting vat and the stream of the oxygen-containing gas.

After the fermentation is complete, the mixture is filtered and the concentration of d-tartaric acid is determined by analysis of an aliquot of the filtrate.

To the filtrate, there is now added a concentrated aqueous solution of one gram of potassium chloride for every two grams of d-tartaric acid present therein, and the pH is adjusted to 3.5 with acetic acid. A crude potassium acid tartrate precipitate is filtered off and purified by recrystallization from water.

The addition of five grams of vanadium pentoxide to the substrate described above, would accelerate the reaction and inhibit the formation of oxalate.

Having described my invention, what I claim and desire to protect by Letters Patent is:

1. A process for producing a compound containing the acid radical of dextro-tartaric acid which comprises fermenting an aqueous solution of glucose with a culture of *Acetobacter suboxydans* while passing an oxygen containing gas through the fermenting mixture and maintaining the pH at a value of from 3.0 to 12.0 by the addition of an alkali chosen from the group consisting of the hydroxides, carbonates and bicarbonates of the alkali-metals.

2. A process for producing a compound containing the acid radical of dextro-tartaric acid which comprises fermenting an aqueous solution of glucose with a culture of *Acetobacter suboxydans* in the presence of a compound of vanadium, while passing an oxygen-containing gas through the fermenting mixture and maintaining the pH at a value of from 3.0 to 12.0 by the addition of an alkali chosen from the group consisting of the hydroxides, carbonates and bicarbonates of the alkali metals.

3. A process for producing a compound containing the acid radical of dextro-tartaric acid which comprises fermenting an aqueous solution of glucose with a culture of *Acetobacter suboxydans*, in the presence of a vanadium compound, while aerating the fermenting mixture and maintaining the pH at a value of from 3.0 to 12.0 by the addition of sodium carbonate, and precipitating the d-tartaric acid thus formed as the insoluble potassium salt.

4. The process described in claim 1, where the pH is kept between 5.0 and 7.0.

5. The process described in claim 1, where the temperature of the fermenting mixture is kept at a value from 10° to 40° C.

6. The process described in claim 1, where the temperature of the fermenting mixture is kept at a value from 27° to 30° C.

7. The process described in claim 1, where the cultures of the bacteria used to inoculate the substrate are no more than three days old.

8. In a process for the direct fermentation of glucose to form a compound containing the acid radical of dextro-tartaric acid, the step which comprises fermenting glucose with a culture of *Acetobacter suboxydans* in a medium having a pH from 3.0 to 12.0 in the presence of an oxygen-containing gas at a temperature from 10° to 40° C.

9. A process for producing a compound containing the acid radical of dextro-tartaric acid which comprises fermenting an aqueous solution of glucose with a culture of *Acetobacter suboxydans* while aerating the fermenting mixture and maintaining the pH at a value of from 3.0 to 12.0 by the addition of sodium carbonate, and precipitating the dextro-tartaric acid thus formed as an insoluble potassium salt.

10. The process described in claim 2, where the pH is kept between 5.0 and 7.0.

11. The process described in claim 2, where the temperature of the fermenting mixture is maintained at a value from 10° to 40° C.

12. The process described in claim 2, where the temperature of the fermenting mixture is maintained at a value from 27° to 30° C.

13. The process described in claim 2, where the cultures of the bacteria used to inoculate the substrate are no more than three days old.

14. The process described in claim 2, where the pH is maintained between 5.0 and 7.0, and the temperature of the fermenting mixture is maintained at a value from 27° to 30° C.

JONAS KAMLET.